US007021241B2

(12) United States Patent
Nock

(10) Patent No.: US 7,021,241 B2
(45) Date of Patent: Apr. 4, 2006

(54) PIVOTING PERCH

(75) Inventor: Robert Kenneth Nock, Cradley Heath (GB)

(73) Assignee: C J Wildbird Foods Limited, Shrewsbury (GB)

( * ) Notice: Subject to any disclaimer, the term of this patent is extended or adjusted under 35 U.S.C. 154(b) by 0 days.

(21) Appl. No.: 10/785,018

(22) Filed: Feb. 25, 2004

(65) Prior Publication Data

US 2004/0231606 A1 Nov. 25, 2004

(30) Foreign Application Priority Data

Feb. 25, 2003 (GB) .................................. 0304226

(51) Int. Cl.
*A01K 61/02* (2006.01)

(52) U.S. Cl. ...................... 119/57.8; 119/52.2; 119/63; 119/72

(58) Field of Classification Search ................. 119/72, 119/57.9, 57.8, 52.3, 52.2, 464, 465, 468, 119/475, 51 R, 63; A01K 31/12
See application file for complete search history.

(56) References Cited

U.S. PATENT DOCUMENTS 2,230,058 A 1/1941 Hornung
2,891,711 A * 6/1959 Early ........................ 229/221
4,223,637 A * 9/1980 Keefe ....................... 119/52.2
4,328,765 A 5/1982 Kilham
4,881,491 A * 11/1989 Brown ................... 119/51.01
5,033,411 A * 7/1991 Brucker .................... 119/52.2
5,105,765 A 4/1992 Loken
6,408,788 B1 * 6/2002 Lieb et al. ................ 119/52.2

FOREIGN PATENT DOCUMENTS

| | | | |
|---|---|---|---|
| DE | 2730066 A | * | 7/1979 |
| DE | 41 02 879 A | | 8/1992 |
| EP | 0104766 | * | 8/1983 |
| EP | 0 104 766 | | 4/1984 |
| GB | 1 345 526 | | 1/1974 |

* cited by examiner

*Primary Examiner*—Peter M. Poon
*Assistant Examiner*—Andrea M. Valenti
(74) *Attorney, Agent, or Firm*—Buchanan Ingersoll PC

(57) ABSTRACT

A bird feeder perch assembly for removable attachment to a bird feeder, the assembly having a locating member for locating and removably engaging a body of the bird feeder, a perch and pivoting mechanism for allowing the perch to pivot relative to the locating member, such that in use when attached to a bird feeder body the perch may pivot from a retracted position in which it is substantially flush with the bird feeder body to an extended position in which the perch projects outwardly from the bird feeder body such that a bird may rest upon the perch.

10 Claims, 7 Drawing Sheets

PIVOTING PERCH

BACKGROUND OF THE INVENTION

Bird feeders having perches attached thereto are well known. Frequently, the perch comprises an elongate rod or the like fixed to a base member of the feeder or to individual feeding ports. Such feeding ports typically comprise a locating member with a central aperture; the member being configured to locate within a wall portion of the feeder. In use a bird resting on the perch normally has to turn its head 90° so that it faces a port aperture where food is dispensed. While there are some bird feeders that avoid this problem, they generally involve a complex perch mechanism. Further, bird feeders tend to be packaged for sale in a fully assembled state; consequently, feeders with protruding perch rods require a packing box considerably larger in cross section than the cross section of the feeder body. This is wasteful, and ultimately results in an environmental penalty; in that the packaging has to be disposed of.

SUMMARY OF THE INVENTION

An object of the present invention is to provide an improved bird feeder perch and in particular a perch that pivots. A further object is to provide a perch that provides improved access to dispensed food for birds resting on the perch.

In a first aspect the bird feeder perch assembly comprises a locating member, a perch and pivoting means that allows the perch to pivot relative to the locating means such that in use the locating member may engage a bird feeder body, and when so engaged the perch may pivot from a retracted position in which the perch is proximal the feeder body to an extended position in which the perch projects outwardly from the body, such that a bird may rest upon the perch Preferably, in moving the perch from a fully retracted position to a fully extended position the perch pivots through angle of at least 80°. The perch may pivot through an angle of 120° to 160° in order to more easily accommodate larger birds.

The pivoting means may comprise a U-shaped recess in the locating member and an engaging shaft attached to or integral with the perch.

Preferably the perch comprises a portion that in use is substantially horizontal and parallel to the plane of an exterior face of the feeder body surface at the region of engagement of the locating member, and displaced some distance from that region of the feeder body. This has the advantage that it allows a bird to rest on the perch and feed without bending its neck.

The perch may comprise at least two elongate members that extend in mutually orthogonal directions. Optionally the perch may be ring-shaped with a pivot at the periphery of the ring. Preferably, the perch is U-shaped and the pivoting means comprises a pivot at each free end of the perch.

Preferably the perch comprises a stop bar that in use abuts a stop member on the locating member. Alternatively, the perch may comprise a stop member that abuts a stop bar on the locating member.

The locating member may comprise a bird feeding port. This provides an improved perch that may advantageously be retracted so that it lies against or close to the outer wall of a bird feeder. Preferably, in use the pivoting means is located below the port aperture and/or a stop bar on the perch abuts against a stop member located below the port aperture.

BRIEF DESCRIPTION OF THE DRAWING FIGURES

A preferred embodiment of the invention will now be described by reference to the following diagramatic figures in which.

FIG. 3*a* to 3*e* show various views of a locating member of the perch assembly.

Figure 4:
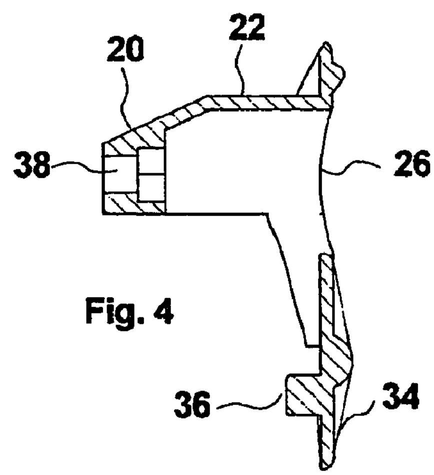
Figure 5A:
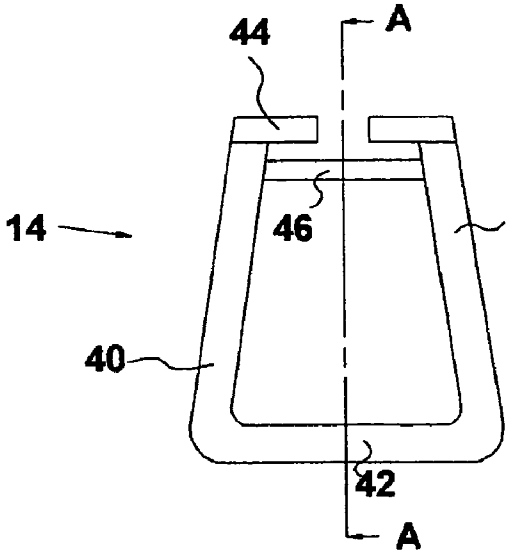
Figure 5E:
Figure 5B:
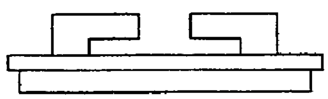

FIG. 4 shows a sectioned side view of the locating member of the perch assembly of FIG. 3.

FIGS. 5*a* to 5*e* show various views of a second part of the perch assembly.

Figure 6:
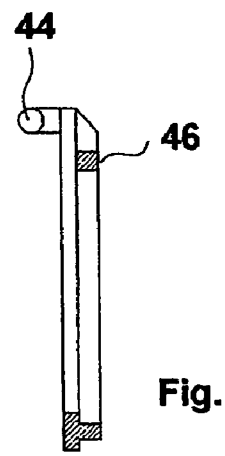
Figure 5C:
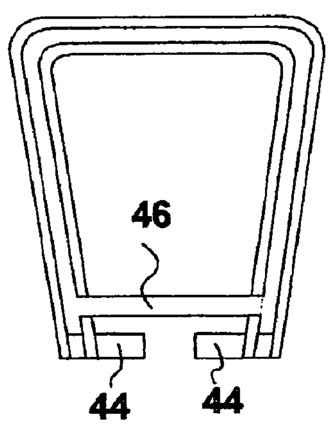
Figure 5D:
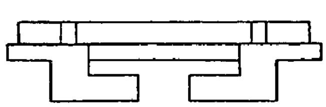

FIG. 6 shows a sectioned side view of the second part of the perch assembly of FIG. 5.

Figure 1:
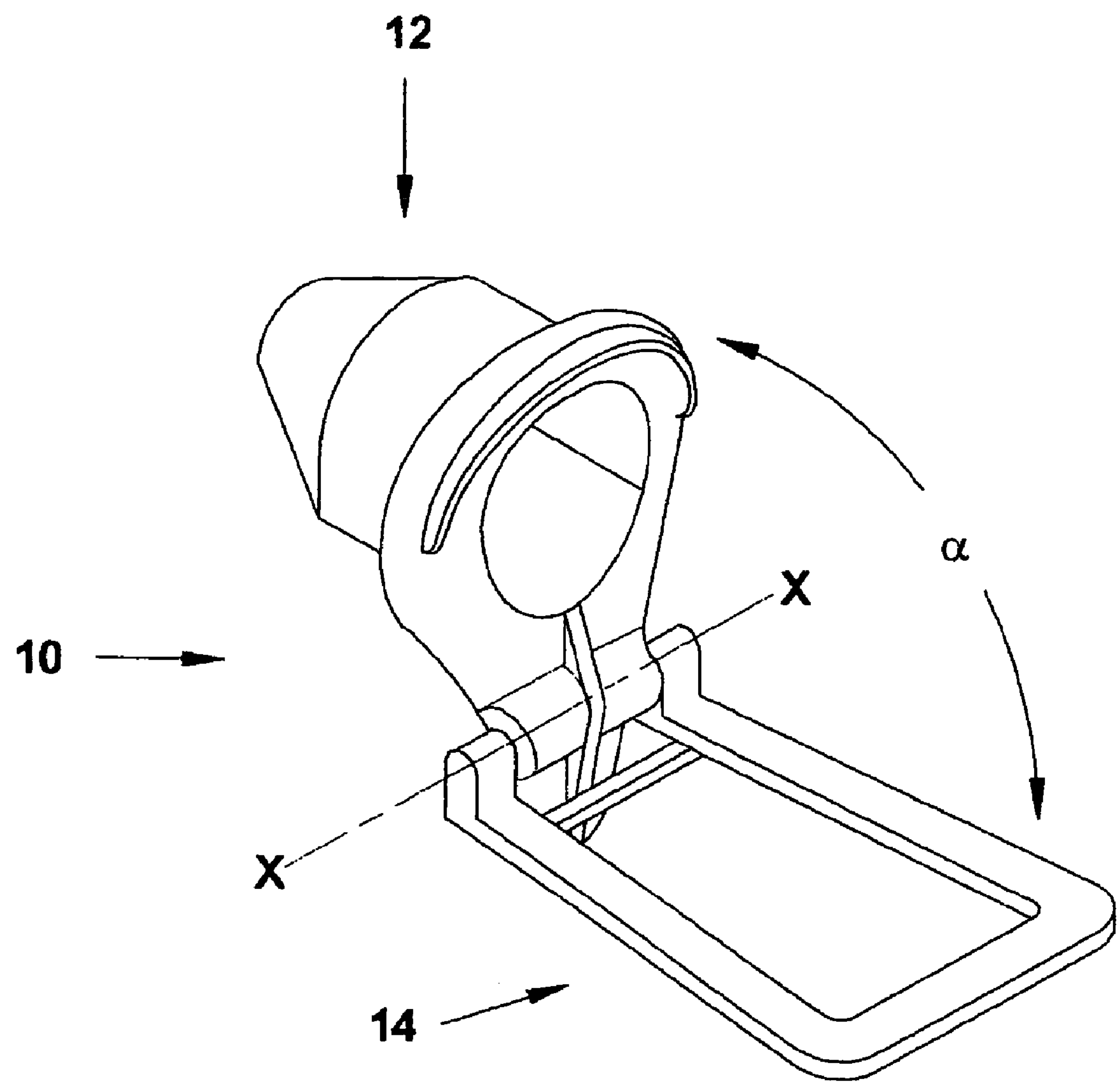
FIG. 1 is a perspective view of a perch assembly according to the invention in an extended position.
Figure 7:
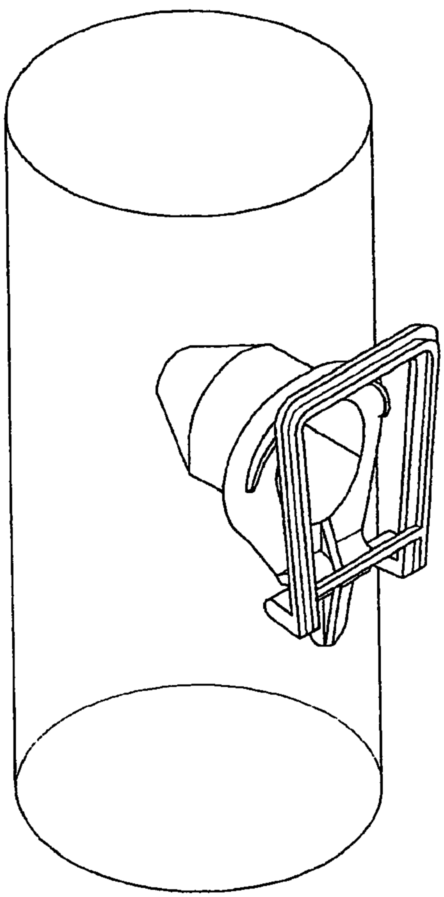
Figure 8:
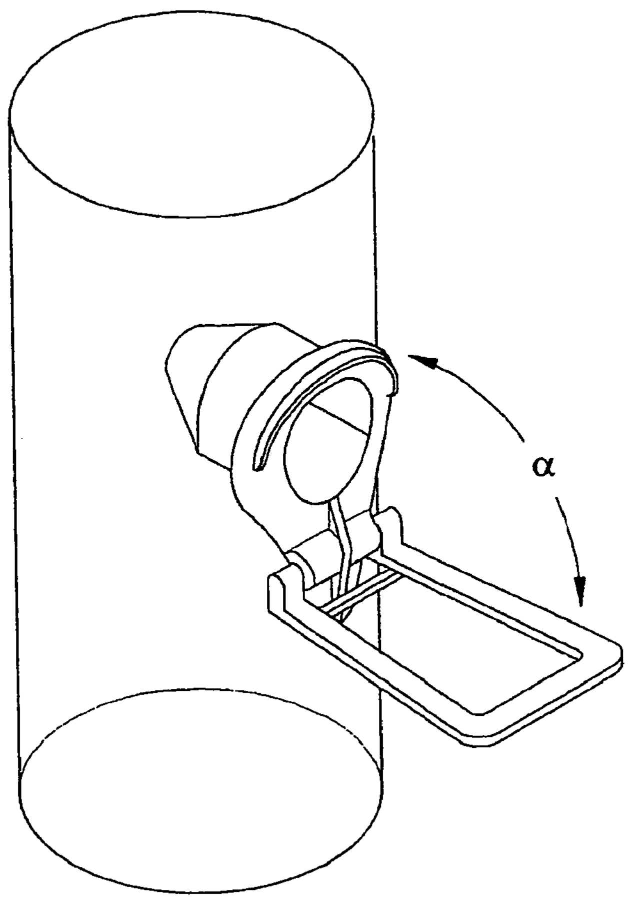

FIGS. 7 and 8 show the perch assembly of FIG. 1 attached to a bird feeder.

Figure 9:
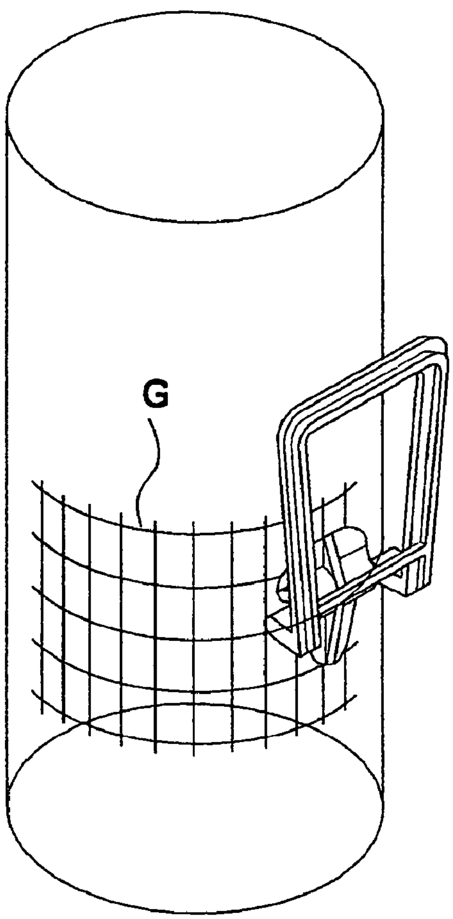
Figure 10:
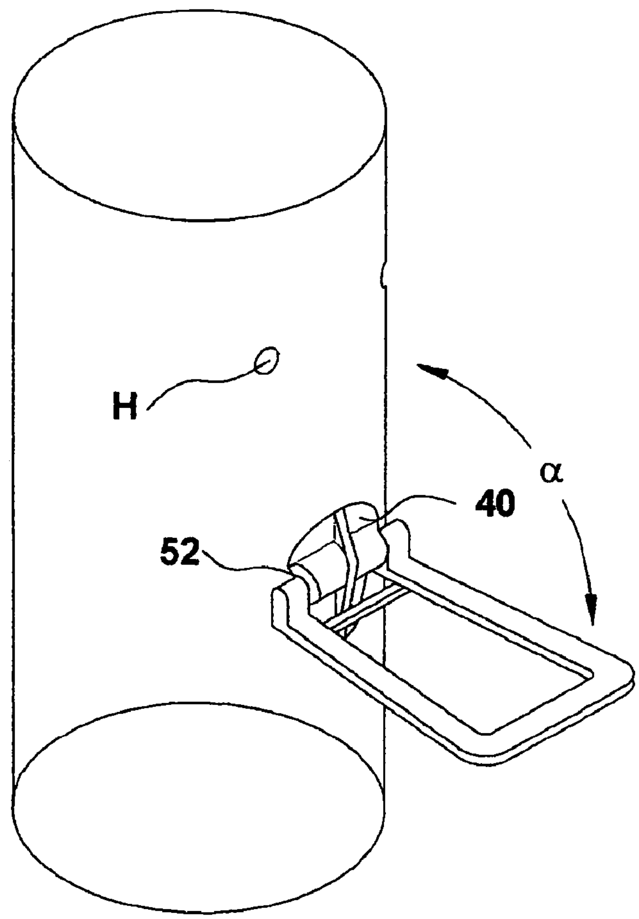
Figure 11A:
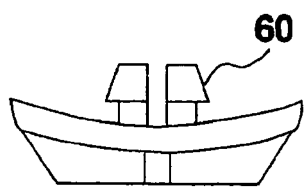
Figure 11D:
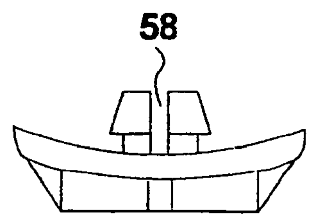
Figure 11B:
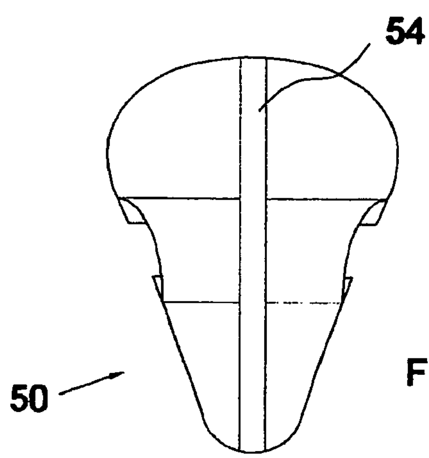
Figure 11E:
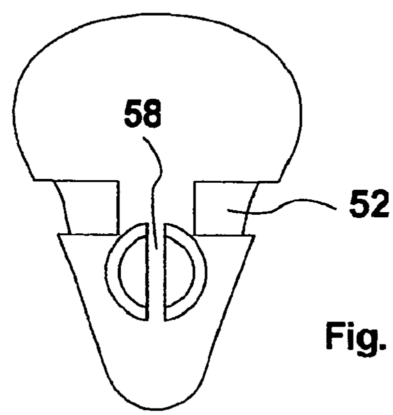
Figure 11C:
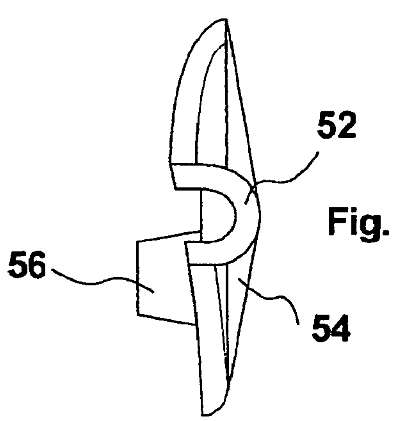

FIGS. 9 and 10 show a further embodiment according to the invention attached to a cage, and to a bird feeder with offset feeding holes respectively.

FIGS. 11*a* to 11*e* show various views of the locating member of the perch assembly shown in FIGS. 9 and 10.

Figure 12:
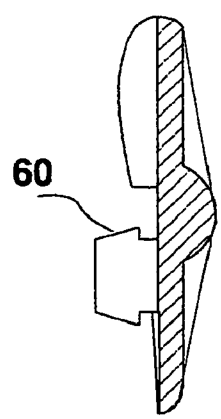

FIG. 12 shows a sectioned side view of the second part of the perch assembly shown in FIGS. 11.

DESCRIPTION OF THE PREFERRED EMBODIMENTS

With reference to FIGS. 1 to 8, FIG. 1 shows a perspective view of a perch assembly 10 according to the invention; the assembly being in a fully opened position. The assembly comprises a first part (locating member) 12 and a second part 14.

The first part 12 may be a bird feeder port with certain modifications as shown in FIGS. 3 and 4 (see latter). In this case, the port 12 may be located in a suitable sized aperture of a bird feeder body. The port 12 comprises a feed distributor 16 and a flange 18. Feed distributor 16 comprises a truncated cylindrical portion 20 and a truncated frustroconical portion 22. Portions 20 and 22 are truncated below their lower half so that, in use, seed may enter the port 12 via the orifice 24 formed by these truncations.

Flange 18 presents a circular orifice 26 via which, in use, a bird may access seed with its beak from the bird feeder. The upper portion of flange 18 has a hood 28 that is positioned so that in use it shields the aperture against rainfall and thus helps keep bird feed dry. The lower portion of flange 18 has a U-shaped recess 30 in each side. These recesses provide pivot means for the second part 14 of the perch assembly 10 (see latter). Between the recesses 30 there is an integral central portion 32 that has a raised front face 34 that acts as a stop member such that when the perch assembly is in a fully extended position (see FIG. 1) the second part 14 abuts against this stop member (see below). The first part 12 also has a protruding notch 36 that, in use, locates a hole in the main body of the bird feeder.

The second part 14 is a perch (see FIGS. 5 and 6), comprising side rails 40 formed integrally with an end rail 42; the two side rails in combination forming a perch that is predominantly U-shaped. The free ends of the side rails each have a pivot rod 44 having a common axis; this axis being generally parallel to the longitudinal axis of the end rail 42. Rods 42 are configured so as to engage the U-shaped recesses 30 in port 12.

Figure 2:
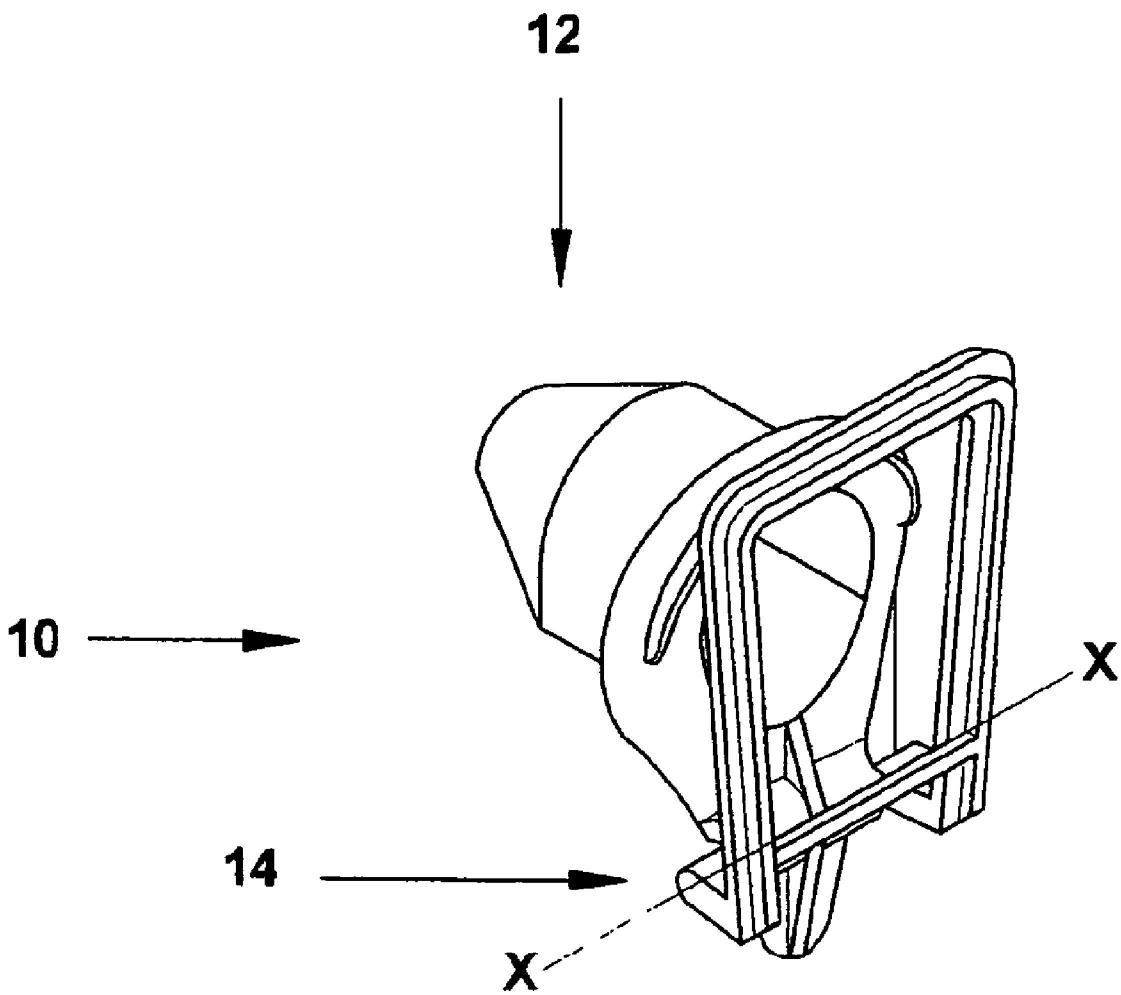
FIG. 2 is a perspective view of a perch assembly of FIG. 1 in a retracted position.
Figure 3A:
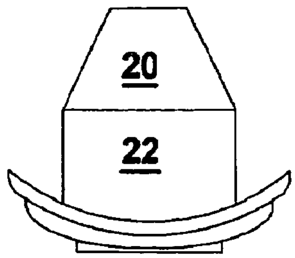
Figure 3B:
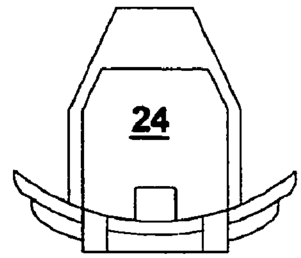
Figure 3C:
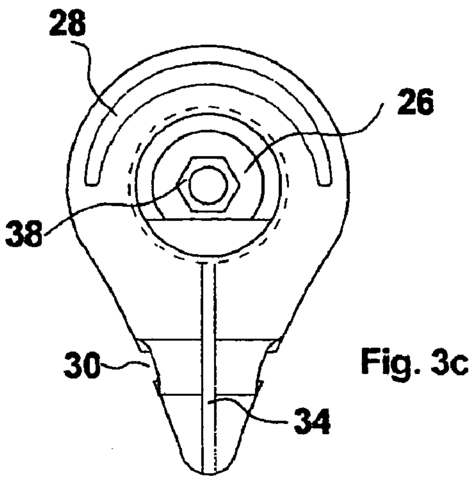
Figure 3D:
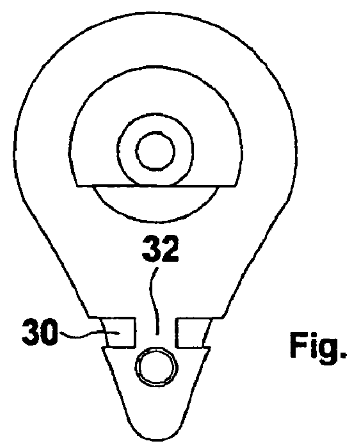
Figure 3E:
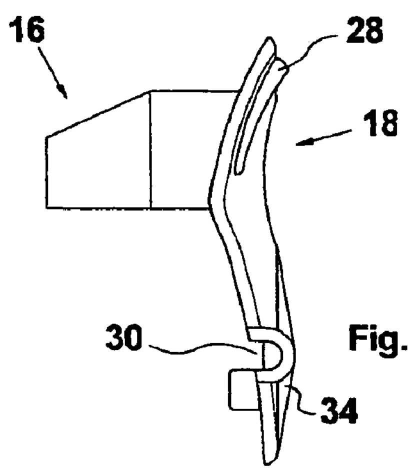

In use port flange 18 is fixed against the outer wall (W) of a bird feeder body. Thus, pivot rods 42 are retained within the U-shaped recesses 30 by this wall. In use, the perch 14 may pivot about axis X–X' (see FIG. 1) allowing it to be moved from a fully extended position (FIG. 1) to a fully retracted position (FIG. 2). Perch 14 has an integral cross bar member 46 in the form of an elongate rod fixed to each side rail 40 near the free end of the rails. This bar 46 abuts against stop member 34 when the perch assembly is in a fully extended position (see FIG. 1). By adjusting the position or size of bar 46 or stop member 34 the fully extended position may be varied. In the example illustrated in FIG. 1 the fully extended position corresponds to the perch pivoting through an angle a, in movement from the fully retracted to the fully open position, of approximately 90°. It has been found that in use providing a stop member 34 as part of port 12 avoids the perch abutting against the feeder body and thereby acting as a lever when a bird is supported on the perch; the leverage tending to dislodge the port from the bird feeder body.

In use birds will often rest upon the end rail 42 of the perch. In this position the bird may feed in a relaxed manner without having to bend its neck as required by most conventional perches where in contrast the bird is facing in a direction perpendicular to the feeding orifice 26. If the perch is designed for relatively large birds it may be preferable to position the bar 34 such that a is approximately 150°. This increases the separation of the end rail 30 from the port aperture 20.

The pivoting means shown in this embodiment comprises two U-shaped recesses 30 and two pivot rods 44. However, a single pivot rod may be formed to connect the "free" ends of the perch side rails 40.

In another embodiment (see FIGS. 9 to 12) the first part 50 excludes the port flange and distributor shown in the embodiment of FIGS. 3 and 4. Hence, first part 50 is essentially a locating member comprising a pair of U-shaped recesses 52, separated by a forward facing stop member 54, and a rearward facing engaging lug 56. In use, lug 56 locates a hole in the outer wall (W) of a bird feeder body. For example, engaging lug 56 may push fit into cage grid G (see FIG. 9) or a small aperture (not shown) located in the body wall of a bird feeder (see FIG. 10) preferably located below a feeding hole H. Preferably, the lug 56 has resilience; this being provided by one or more slots 58 and/or by selection of a suitably resilient material for the lug. This resilience combined with a frustroconically tapered outer profile 60 assists location and engagement of lug 56 in use.

The perch of the invention advantageously provides a portion of the perch that, when fully retracted, is substantially parallel to the outer surface of a feeder to which it is attached. It is not essential that the perch be generally U-shaped to achieve this effect. For example, the perch may be generally ring-shaped, T-shaped or L-shaped. Further, the perch may have a single rail and a single pivot, rather than the two side rails and two pivots shown in FIG. 1.

What is claimed is:

1. A perch assembly for removable attachment to a bird feeder having a bird feeder body, said perch assembly comprising:

a locating member removably engaging the bird feeder body, a perch, and pivoting means allowing the perch to pivot relative to said locating member, said pivoting means comprising a recess in said locating member and a pivot rod, wherein, when said locating member engages the bird feeder body, said pivot rod is held in place by said recess against the bird feeder body and said perch may pivot about said pivot rod from a retracted position in which said perch is substantially flush with the a bird feeder body to an extended position in which said perch projects outwardly from the bird feeder body such that a bird may rest upon said perch, wherein said locating member comprises a bird feeding port and said perch is disposed beneath said feeding port.

2. An assembly according to claim 1 wherein said perch pivots about an axis that, in use, is either substantially parallel to or tangential to the outer surface of the bird feeder body.

3. An assembly according to claim 1 wherein said recess in said locating member is U-shaped.

4. An assembly according to claim 1 wherein in moving from retracted position to extended position said perch pivots through an angle of at least 80°.

5. An assembly according to claim 1 wherein said perch comprises a restraining portion that is displaced some distance outward from the axis about which said perch may pivot such that when said perch is in the fully extended position said restraining portion abuts against a stop member that is integral with or attached to said locating member.

6. An assembly according to claim 1 wherein said perch comprises at least two elongate members that extend in mutually orthogonal directions.

7. An assembly according to claim 1 wherein said perch is ring-shaped and where said pivoting means comprises a pivot at the periphery of said ring.

8. An assembly according to claim 1 wherein said perch is U-shaped and said pivoting means comprises a pivot at each free end of said perch.

9. An assembly according to claim 1 wherein said pivoting means comprises a plurality of recesses in said locating member.

10. An assembly according to claim 1 wherein in use said pivoting means is located below said bird feeding port.

* * * * *